United States Patent [19]

Kowalski et al.

[11] 4,297,570

[45] Oct. 27, 1981

[54] MAGNETIC STRIPE

[75] Inventors: George A. Kowalski, Deer Park, N.Y.; George Mayer, Hamden, Conn.; Murray Rosenbaum, New York, N.Y.

[73] Assignee: Koller & Smith Co., Inc., Pelham, N.Y.

[21] Appl. No.: 76,158

[22] Filed: Sep. 17, 1979

[51] Int. Cl.³ .................... G06K 19/02; G11B 25/04; G06K 19/06
[52] U.S. Cl. .................... 235/493; 235/488; 360/2
[58] Field of Search ............ 235/488, 490, 493, 487; 360/2, 131

[56] References Cited

U.S. PATENT DOCUMENTS

| | | | |
|---|---|---|---|
| 3,325,632 | 6/1967 | Lilly | 235/493 |
| 3,644,716 | 2/1972 | Nagata | 235/488 |
| 3,676,644 | 7/1972 | Vaccaro | 235/488 |
| 3,838,252 | 9/1974 | Hynes | 360/2 |
| 3,874,586 | 4/1975 | Foote | 360/2 |
| 3,986,205 | 10/1976 | Fayling | 235/493 |
| 4,090,662 | 5/1978 | Fayling | 360/2 |

*Primary Examiner*—Robert M. Kilgore

*Attorney, Agent, or Firm*—Kirschstein, Kirschstein, Ottinger & Cobrin

[57] ABSTRACT

A stripe for magnetically receiving encoded information; the stripe is bonded and adhered to any type of document having a paper substrate onto which the magnetic stripe is deposited, usually in the form of a narrow rectilinear strip, which is raised above the original surface of the paper substrate by embossing the latter during deposition of the magnetic stripe. Basically the invention entails the provision of a flexible sheet for use in forming a magnetic recording medium in the form of a magnetic stripe on a paper substrate, e.g. a document such as a bank passbook. The sheet includes a first layer of magnetic-particle-free thermoplastic material, which is bonded to the paper substrate by application of high temperature and pressure to a local narrow rectilinear area thereof. Above the first layer and permanently bonded thereto is a middle layer of magnetizable material consisting of a plurality of discrete magnetizable particles dispersed in a matrix. Above the middle layer is a second layer of magnetic-particle-free thermoplastic material permanently bonded to the middle layer. A carrier web such as Mylar (a phthalate ester) is detachably bonded to the second layer of thermoplastic material.

9 Claims, 8 Drawing Figures

U.S. Patent  Oct. 27, 1981  4,297,570
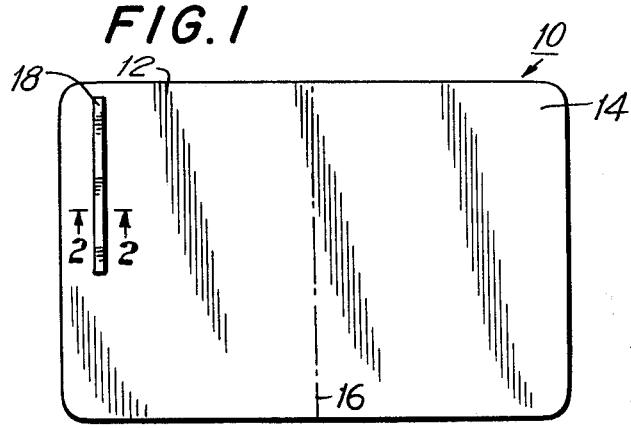
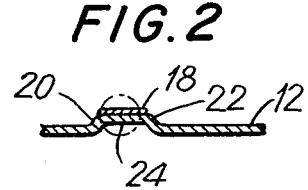
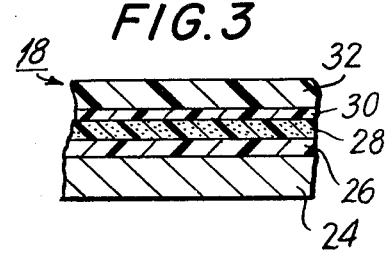
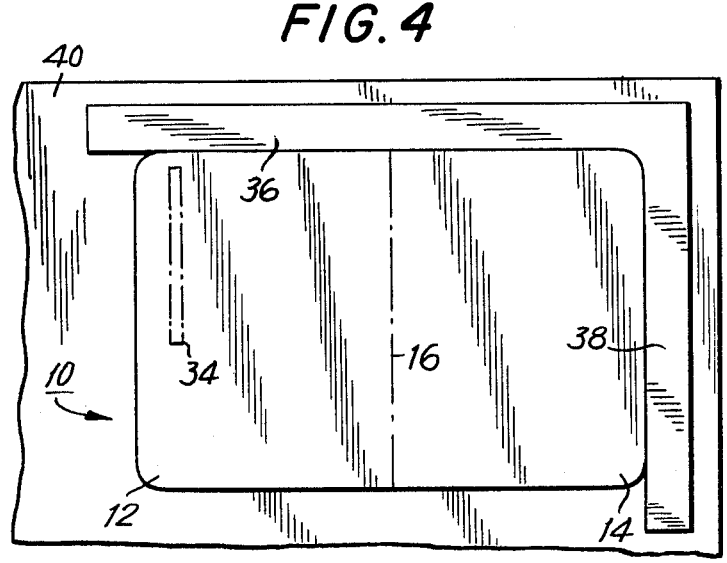
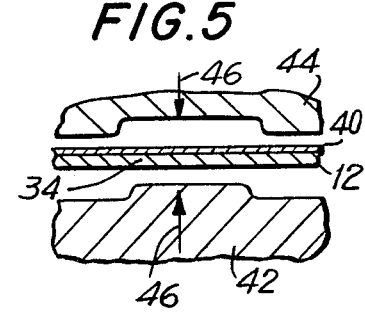
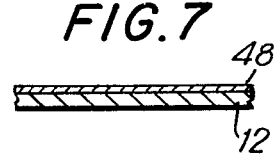
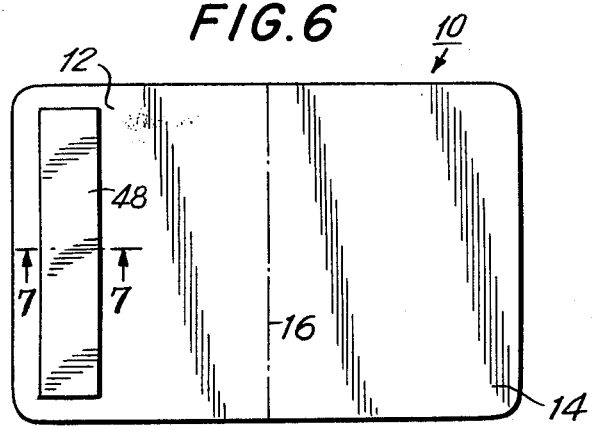
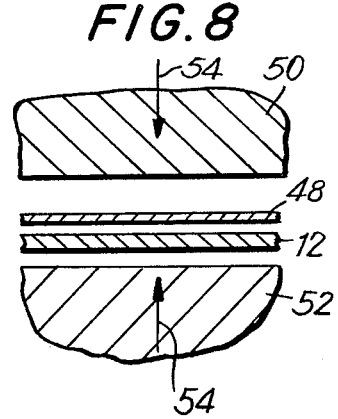

MAGNETIC STRIPE

BACKGROUND OF THE INVENTION

1. Field of the Invention

A magnetic stripe on a document and intended to receive magnetic information.

2. Description of the Prior Art

Heretofore, when a patron of a bank approached a teller, he gave the teller his passbook and either a deposit slip or a withdrawal slip. The teller then had to look up the person's card and repeat the person's account number on various internal transactions within the bank.

By providing the passbook with a magnetic stripe on which the patron is identified by bytes of information, the computer system at the bank acquires this knowledge without having to have it supplied by the teller, and uses this knowledge on all internal transactions. This basic concept is not new. Some banks have heretofore tried to use this concept. They have proposed various ways of getting a magnetic stripe on the passbook. One way was to glue a substrate carrying a magnetic coating onto the passbook. The trouble with this structure was that the substrate had a finite thickness, and when the passbook was passed through a reader, the magnetic read head had to adjust to the difference in thickness between the passbook without the substrate and the passbook with the substrate. A magnetic head must be in very close proximity to the magnetic coating. But the magnetic head usually is fixed so that if it is close to the passbook cover, it will strike the edge of the substrate, and if it is close to the coating, it will be too far from the substrate.

Another one of the problems with the prior magnetic systems was that the magnetic coating was somewhat rough and abraded the magnetic head. The coating usually consists of tiny particles of a magnetic iron oxide, each of which is of crystalline configuration and therefore has sharp edges and points. Even if embedded in plastic, this type of coating presents a surface that is highly abrasive. This, too, is bad for magnetic readings.

Thus the prior art systems generally entailed the use of Mylar, e.g. Scotch tape, with a magnetic coating, which was applied to the bank passbook or like document having a paper substrate. The Mylar did not release readily but was removable and loose at the moment of application. One problem was inexact placement whether by machine or by hand. In most prior art techniques, placement was by hand. There is a high failure rate in this system, typically 20% to 30% failures, and the failure is only determinable after application. Bounce is a problem when the magnetic head encounters the Mylar strip. Some strips had magnetic oxides too deeply sunk and this increased the failure rate. The shelf life factor was poor, and close control on temperature was needed. Finally, Mylar deteriorates with age and use after application.

Among the prior art relative to magnetically readable labels and the like are U.S. Pat. Nos. 4,090,662 and 4,090,003.

SUMMARY OF THE INVENTION

1. Purposes of the Invention

It is an object of the present invention to provide an improved magnetic stripe for documents such as a bank passbook having a paper substrate.

Another object is to provide an improved flexible sheet for use in forming a magnetic recording medium in the form of a stripe on a paper substrate.

A further object is to provide an improved method of applying a recording magnetic stripe to a paper substrate of a document.

An additional object is to provide a document having a paper substrate and encodable with permanent, machine-readable digital data, with an integral permanently attached recording magnetic stripe.

Still another object is to provide an improved magnetic stripe on a bank passbook so that the stripe may receive bytes of magnetic information, whereby simplifying and retrieval of information within the bank can be accomplished.

Still a further object is to provide a magnetic stripe for a document in which the matrix for the particulate magnetic material is of soft thermoplastic, so that when it is heated the magnetic oxide particles tend to sink into the layer and, moreover, the layer tends to rise above the uppermost magnetic oxide particles so that, in the finished article, there is a coating of this matrix over the uppermost particles whereby the uppermost particles no longer will abrade the magnetic head.

Still an additional object is to keep the superimposed stripe of magnetic oxide particles in a matrix at a low level.

An object is to provide a flexible sheet from which a magnetic stripe is locally detached and transferred onto a paper substrate of a document, so that the location of the stripe on the document, and the width and length of the stripe, can be varied at will.

An object is to provide a magnetic stripe in which adhesion to a paper substrate is far superior to prior art techniques and materials.

An object is to provide a magnetic stripe in which positioning can be kept within 0.002".

An object is to provide a magnetic stripe which is held on a carrier web until locally detached therefrom and attached to a paper substrate and is then first released.

An object is to provide a magnetic stripe in which the carrier web is stripped and therefore is not present on the finished article, therefore extending shelf life for a longer and non-critical period.

An object is to provide a magnetic stripe for documents having a lower failure rate of less than 10 to 12% as compared to prior art configurations.

An object is to provide a magnetic stripe for documents which can be checked for quality control before binding in pages of the document.

An object is to provide a magnetic stripe which is permanently emplaced on a document.

An object is to provide a magnetic stripe in which there is no bounce of the magnetic head when encoding or reading the stripe.

An object is to provide a magnetic stripe in which the magnetic oxide is at exactly the right level for usage and capable of being encoded and/or read while not abrading the magnetic head.

An object is to provide a magnetic stripe which is raised by embossing the paper substrate so as to enable the width of the stripe to be reduced.

An object is to provide a magnetic stripe for documents with the assured security of a permanently bonded non-removable stripe.

An object is to eliminate the costly consumption of time by bank tellers in affixing stripes on bank passbooks.

An object is to provide a magnetic stripe for a bank passbook which has at least 50% and up to 100% longer life in terms of magnetic retention than is needed for the limits of book entries.

An object is to provide a magnetic stripe which may be exactly positioned on a document such as a bank passbook.

These and other objects and advantages of the present invention will become evident from the description which follows.

2. Brief Description of the Invention

The present invention in one embodiment features a flexible sheet of specific configuration, from which one or a series of magnetic stripes may be deposited on one or a group of paper substrates of a document such as a bank passbook, a passport, a cash card, a security card, a ledger card, a signature card, a firm book, a C.D. notice, an identification card, etc., or on the paper substrate of any document which is to be correlated with a specific individual entity such as a person, a firm, a corporation, or a geographical location, etc.

The present flexible sheet for use in forming a magnetic recording medium in the form of a stripe on a paper substrate includes a first layer of magnetic-particle-free thermoplastic material, a middle layer of magnetizable material, a second layer of magnetic-particle-free thermoplastic material, and a carrier web. The first layer of magnetic-particle-free thermoplastic material is bondable to the paper substrate by application of elevated temperature and pressure to a local area thereof. The middle layer of magnetizable material is permanently bonded to the first thermoplastic layer, and the middle layer of magnetizable material basically consists of a plurality of discrete magnetizable particles dispersed in a matrix. The second layer of magnetic-particle-free thermoplastic material is permanently bonded to the middle layer of magnetizable material. The middle layer of magnetizable material is compatible with both the first and second layers of thermoplastic material, and typically the matrix of the middle layer is also a thermoplastic.

The carrier web, which usually consists of Mylar, e.g. Scotch tape, which is a phthalate ester, is detachably bonded to the second layer of thermoplastic material, usually by the provision of an intervening adhesive layer of glue or the like between the carrier web and the second thermoplastic layer. Thus, when elevated temperature and pressure is applied to a narrow rectilinear local area of the web, while the first layer of thermoplastic material is disposed on the paper substrate, a magnetic stripe is detached from the sheet and transferred to the paper substrate. The second layer of thermoplastic material forms an outer polish layer on the stripe that reduces irregularities in the outer surface of the stripe due to the magnetic particles, and minimizes abrasion of recording, erasing and reading heads. The carrier web is then readily stripped from the balance of the adhered thermoplastic layers which constitute the recording magnetic stripe.

In a preferred embodiment, the first and second thermoplastic layers of the flexible sheet are composed of a flexible thermoplastic such as a copolymer of ethylene and vinyl acetate, polystyrene, polyethylene, polyvinyl chloride or polyvinyl acetate. The layer of magnetizable material typically consists of discrete particles of magnetic iron oxide, chromium oxide, cobalt oxide or barium ferrite, dispersed in a matrix such as an ethylene-vinyl acetate copolymer, a mixture of polyurethane elastomer and phenoxy resin, polystyrene, polyethylene, polyvinyl chloride or polyvinyl acetate.

The first thermoplastic layer of the flexible sheet is typically bondable to the paper substrate by the application of a temperature in the range of about 200° F. to about 300° F. and a pressure in the range of about 10,000 psia to about 12,000 psia, by means of a pair of opposed dies such as opposed male and female dies, in any suitable die press.

Generally, the thermoplastic matrix of the middle layer of magnetizable material becomes sufficiently plastic under the influence of elevated temperature and pressure during bonding, to permit the migration of magnetic particles towards the paper substrate during the application of elevated temperature and pressure. In other words, the finished magnetic stripe for a document has a matrix for the particulate magnetic material which is preferably of soft thermoplastic, so that when it is heated, the magnetic oxide particles tend to sink into the layer and, moreover, the layer tends to rise above the uppermost magnetic oxide particles so that, in the finished article, there is a coating of this matrix over the uppermost particles which no longer will abrade the magnetic head. In addition, as mentioned supra, the second layer of thermoplastic material forms an outer polish layer on the stripe that reduces irregularities in the outer surface of the stripe due to the magnetic particles, and thus minimizes abrasion of recording, erasing and reading magnetic heads.

The invention also includes the method of applying the recording magnetic stripe to the paper substrate. In this embodiment of the invention, the flexible sheet as described supra is provided and disposed against the paper substrate, the paper substrate being disposed in a predetermined location between a pair of dies. At least one die is heated. The dies are closed to raise the temperature and pressure to the magnitudes enumerated supra, along and within a local narrow usually rectilinear area of the flexible sheet and paper substrate for a finite time interval, e.g. about 10 seconds, so that the dies heat the flexible sheet sufficiently to break the bond between the carrier web and the second layer of thermoplastic material, and to at least tackify, i.e. soften, partially liquefy and/or flow, the first layer of thermoplastic material, so that the first thermoplastic layer bonds to the paper substrate. The die press and pair of dies is then opened, and the paper substrate is removed together with adhered layers of thermoplastic material in the form of a stripe. Finally, the carrier web is locally stripped from the balance of the adhered thermoplastic layers which now constitute a recording magnetic stripe.

Preferably, the paper substrate is embossed under the adhered layers of thermoplastic material during the formation of the magnetic stripe, so that the adhered thermoplastic layers which constitute a recording magnetic stripe is raised above the original surface of the paper substrate.

The invention also includes the document per se having the present integral permanently attached recording magnetic stripe on a paper substrate so that the document is encodable with permanent, machine-readable digital data. In this case the document features the magnetic stripe characterized by the provision of the first and second magnetic-particle-free thermoplastic layers and the middle layer of magnetizable material, all as described supra, the document being devoid of the carrier web in this case. Typically also in the case of the document per se, the paper substrate under the recording magnetic stripe is embossed, so that the magnetic stripe is raised above the original surface of the paper substrate.

The present invention provides numerous salient advantages. The magnetic stripe is securely and permanently bonded to the paper substrate of a document, such as the cover of a bank passbook. Thus the permanently bonded stripes are not removable without defacing the document. The present magnetic stripes are positioned exactly during the manufacturing process. The present magnetic stripes save time or eliminate consumption of time in affixing separate stripes. The present invention eliminates dual inventories of documents, e.g. bank passbooks, and stripes.

Other principal advantages of the invention include the fact that the improved magnetic stripe is derived and formed from an improved flexible sheet which is used in forming the magnetic recording medium in the form of a stripe on a paper substrate. An improved method of applying a recording magnetic stripe to a paper substrate of a document is provided. The document is thus encodable with permanent machine-readable digital data, due to the integral permanently attached recording magnetic stripe. The improved magnetic stripe when on a bank passbook may receive bytes of magnetic information, so that retrieval of information within the bank is simplified and expedited.

Another advantage is that there is a coating of the second thermoplastic layer (outer polish layer) and/or the thermoplastic matrix of the middle layer over the uppermost particles of the particulate magnetic material in the middle layer of magnetizable material, so that the uppermost particles no longer will abrade the magnetic head. This improved result is particularly attained when the matrix for the particulate magnetic material is of soft thermoplastic, so that when it is heated, the magnetic oxide particles tend to sink into the layer and, moreover, the layer or matrix tends to rise above the uppermost magnetic oxide particles. Thus, in the finished article, there is a coating of this matrix and/or the outer polish layer over the uppermost particles.

Other advantages are that the superimposed stripe of magnetic oxide particles in a matrix is kept at a low level, adhesion to the paper substrate is far superior to prior art techniques and materials, positioning of the magnetic stripe can be kept within 0.002", and the fact that the magnetic stripe is held on a carrier web until attached to a paper substrate and is then first released. Thus, the carrier web is subsequently stripped from the magnetic stripe and therefore is not present on the finished article, therefore extending shelf life for a longer and non-critical period. A lower failure rate of less than 10% to 12% is encountered, as compared to prior art configurations.

Further advantages include the feature that a flexible sheet is provided, from which the magnetic stripe is transferred onto the paper substrate of a document, so that the location of the stripe on the document, and the width and length of the stripe, can be varied at will. The magnetic stripe can be checked for quality control before binding in pages of the document. The magnetic stripe is permanently emplaced on the document, and cannot be removed without defacing or destroying part of the document, hence any tampering with the magnetic stripe and/or with the document is readily perceived. There is no bounce of the magnetic head when encoding or reading the stripe. The magnetic oxide in the stripe is at exactly the right level for usage, and thus the magnetic stripe is capable of being encoded and/or read while not abrading the magnetic head. The magnetic stripe is raised by embossing the paper substrate; this enables the width of the stripe to be reduced. The present magnetic stripe for documents provides the assured security of a permanently bonded non-removable stripe. The costly consumption of time by personnel in affixing stripes to documents is eliminated or reduced, e.g. bank tellers no longer have to lose time by taking time to affix stripes to bank passbooks. The present magnetic stripe when affixed to a bank passbook has at least 50% and up to 100% longer life in terms of magnetic retention than is needed for the limits of book entries. Finally, the present magnetic stripe may be exactly positioned on a document such as a bank passbook, thus providing product uniformity and consistency with regard to usage.

The invention accordingly consists in the features of construction, combination of elements, arrangement of parts and series of steps which will be exemplified in the method and article of manufacture hereinafter described, and of which the scope of application will be indicated in the appended claims.

BRIEF DESCRIPTION OF THE DRAWINGS

In the accompanying drawings in which are shown several of the various possible embodiments of the invention:

FIG. 1 is a plan view of a document, in this case a bank passbook, with the present magnetic stripe affixed thereto;

FIG. 2 is a partial sectional elevation view taken substantially along the line 2—2 of FIG. 1;

FIG. 3 is an enlarged elevation view of the magnetic stripe portion of FIG. 2;

FIG. 4 is a plan view which shows a passbook emplaced for the affixing of a magnetic stripe;

FIG. 5 shows a typical configuration of male and female dies with interposed passbook and flexible sheet;

FIG. 6 shows another configuration of the finished product in plan view, namely a passbook with a broader single-layered sheet or stripe of magnetic material;

FIG. 7 is a partial sectional elevation view taken substantially along the line 7—7 of FIG. 6; and FIG. 8 shows an alternative die configuration as utilized to form the configuration of FIG. 6.

DETAILED DESCRIPTION OF THE PREFERRED EMBODIMENTS

Referring now to FIGS. 1, 2 and 3, a bank passbook 10 has two opposed cover sides 12 and 14 and a central fold 16. A magnetic stripe 18 in the form of a narrow rectilinear strip has been attached and adhered to the cover side 12, with the side 12 being raised and embossed immediately below the magnetic stripe 18, see FIG. 2 which shows the shoulders 20 and 22 and the raised central section 24 of the embossed portion of the side 12. FIG. 3 shows the portion 24 of the passbook side 12, with adhered heat fusible first thermoplastic layer 26, which is magnetic-particle-free thermoplastic material, and which has been bonded to the paper substrate 24 by the application of high temperature and pressure to a local narrow rectilinear area thereof, namely, section 24 per se. Also shown above the first layer 26 and permanently bonded thereto is a middle layer 28 of magnetizable material consisting of a plurality of discrete magnetizable particles dispersed in a matrix. Above the middle layer 28 is a second layer 30 of magnetic-particle-free thermoplastic material permanently bonded to the middle layer 28. A carrier web 32 typically composed of Mylar, e.g. Scotch tape, which is a phthalate ester, is detachably bonded to the second layer 30 of thermoplastic material.

FIG. 4 shows a typical arrangement of the passbook 10 during emplacement and adhesion of the magnetic stripe, which is emplaced on the passbook cover side 12 in the narrow rectilinear area 34 shown in phantom outline. Jig legs 36 and 38 hold the passbook 10 in position over a flat holding plate 40 of the present structure, which is used in forming the magnetic recording medium in the form of a stripe on the paper substrate of cover side 12.

FIG. 5 illustrates how a male die 42 and a female die 44 converge as shown by the arrows 46 to form the magnetic stripe in situ. FIG. 6 shows a finished and sowewhat wider magnetic stripe 48 in place on the cover side 12 of the bank passbook 10. FIG. 8 illustrates how flat dies 50 and 52 may be used to accomplish the in situ formation of a wider magnetic stripe such as 48, the die halves converging as shown by the arrows 54.

It thus will be seen that there are provided a method and articles of manufacture which achieve the various objects of the invention and which are well adapted to meet the conditions of practical use.

As various embodiments might be made of the above invention, and as various changes might be made in the embodiments above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with Patent Statutes, the invention is not limited thereto or thereby.

Having thus described the invention, there is claimed as new and desired to be secured by Letters Patent:

1. A flexible sheet for use in forming a magnetic recording medium in the form of a stripe on a paper substrate, said sheet comprising a first layer of magnetic-particle-free thermoplastic material, said first thermoplastic layer being bondable to said paper substrate by application of elevated temperature and pressure to a local area thereof, a middle layer of magnetizable material permanently bonded to said first thermoplastic layer, said layer of magnetizable material consisting of a plurality of discrete magnetizable particles dispersed in a thermoplastic matrix, a second layer of magnetic-particle-free thermoplastic material, said second thermoplastic layer being permanently bonded to said middle layer of magnetizable material, said middle layer of magnetizable material being compatible with both said first and second layers of thermoplastic material, and a carrier web detachably bonded to said second layer of thermoplastic material, such that when elevated temperature and pressure is applied to a narrow rectilinear local area of said web while said first layer of thermoplastic material is disposed on said paper substrate, a magnetic stripe composed of superposed portions of said first, middle and second layers is detached in the shape of said area from said carrier web and the portions of said layers remaining on the web and transferred to said paper substrate, said second layer of thermoplastic material in said stripe forming an outer polish layer on the stripe that reduces irregularities in the outer surface of the stripe due to the magnetic particles and minimizes abrasion of recording, erasing and reading heads, said thermoplastic matrix of the middle layer of said stripe becoming sufficiently plastic under the influence of elevated temperature and pressure during bonding to permit migration of magnetic particles towards said paper substrate during the application of elevated temperature and pressure.

2. The flexible sheet of claim 1 in which the first and second thermoplastic layers are composed of a flexible thermoplastic selected from the group consisting of a copolymer of ethylene and vinyl acetate, polystyrene, polyethylene, polyvinyl chloride and polyvinyl acetate, and the layer of magnetizable material is selected from the group consisting of magnetic iron oxide, chromium oxide, cobalt oxide and barium ferrite dispersed in a matrix selected from the group consisting of an ethylene-vinyl acetate copolymer, a mixture of polyurethane elastomer and phenoxy resin, polystyrene, polyethylene, polyvinyl chloride and polyvinyl acetate.

3. The flexible sheet of claim 1 in which the paper substrate is a document which can be correlated with a specific individual entity.

4. The flexible sheet of claim 1 in which the first thermoplastic layer is bondable to a paper substrate by the application of a temperature in the range of about 200° F. to about 300° F. and a pressure in the range of about 10,000 psia to about 12,000 psia.

5. A method of applying a recording magnetic stripe to a paper substrate which comprises
 (a) providing a flexible sheet as set forth in claim 1,
 (b) disposing said paper substrate in a predetermined location between a pair of dies,
 (c) disposing said flexible sheet against said paper substrate, at least one die being heated,
 (d) closing said dies to raise the temperature of the sheet to between about 200° F. to about 300° F. and applying a pressure in the range of about 10,000 psia to about 12,000 psia to a local narrow rectilinear area of the flexible sheet and paper substrate for a finite time interval, so that said dies heat the flexible sheet sufficiently to break the bond between the carrier web and the second layer of thermoplastic material in the shape of said area, and to at least tackify the first layer of thermoplastic material whereby said first thermoplastic layer bonds to the paper substrate as a stripe in the shape of said area and composed of superposed portions of said first, middle and second layers, and such that the second layer of thermoplastic material forms an outer polish layer that reduces irregularities due to the magnetic particles and minimizes abrasion of recording, erasing and reading heads, the thermoplastic matrix of the middle layer of magnetizable material becoming sufficiently plastic under the influence of said elevated temperature and pressure during bonding to permit migration of magnetic particles towards said paper substrate during the application of said elevated temperature and pressure,
 (e) opening said dies and removing the paper substrate and adhered layers of thermoplastic material in the form of the stripe,
 (f) detaching the magnetic stripe from the carrier web and the portions of said layers remaining on the web, and (g) locally stripping the carrier web from the balance of the adhered thermoplastic layers, the adhered thermoplastic layers constituting the recording magnetic stripe.

6. The method of claim 5 in which the paper substrate is embossed under the adhered layers of thermoplastic material, so that the adhered thermoplastic layers constituting a recording magnetic stripe is raised above the surface of the paper substrate.

7. A document having a paper substrate and encodable with permanent, machine-readable digital data, said document having an integral permanently attached recording magnetic stripe comprising three successive layers, said three layers comprising a first layer of magnetic-particle-free thermoplastic material permanently bonded to said paper substrate by application of elevated temperature and pressure, a middle layer of magnetizable material permanently bonded to said first layer of thermoplastic material and consisting of a plurality of discrete magnetizable particles dispersed in a thermoplastic matrix, and a second layer of magnetic-particle-free thermoplastic material, said second layer of thermoplastic material being permanently bonded to said layer of magnetizable material and forming an outer polish layer on the stripe that reduces irregularities in the outer surface of the stripe due to the magnetic particles and minimizes abrasion of recording, erasing and reading heads, said thermoplastic matrix of said middle layer having become sufficiently plastic under the influence of elevated temperature and pressure during bonding so as to permit migration of magnetic particles towards said paper substrate during the application of elevated temperature and pressure.

8. The document of claim 7 in which the paper substrate under the recording magnetic stripe is embossed, so that the recording magnetic stripe is raised above the surface of the paper substrate.

9. A method of applying a recording magnetic stripe to a paper substrate, which comprises
(a) providing a flexible sheet comprising a first layer of magnetic-particle-free thermoplastic material, another layer of magnetizable material permanently bonded to said first thermoplastic layer, said another layer consisting of a plurality of discrete magnetizable particles disposed in a thermoplastic matrix, the thermoplastic matrix of said another layer being compatible with the thermoplastic material of said first layer, and a carrier web on which a composite of said first and said another layer are detachably bonded;
(b) disposing said paper substrate in a predetermined location between a pair of dies;
(c) disposing said flexible sheet against said paper substrate, at least one die being heated;
(d) closing said dies to raise the temperature of the sheet to between about 200° F. to about 300° F. and applying a pressure in the range of about 10,000 psia to about 12,000 psia to a local narrow rectilinear area of the flexible sheet and paper substrate for a finite time interval, such that said dies heat the flexible sheet sufficiently to break the bond between the composite layers and the carrier web, and to at least tackify the first layer of thermoplastic material whereby said first thermoplastic layer bonds to the paper substrate, said application of heat and pressure rendering the local narrow rectilinear area of the composite layers detachable from the balance of said layers and from the carrier web;
(e) opening said dies and removing the paper substrate with the adhered detached area of the composite layers in the form of a stripe, and
(f) locally stripping the carrier web from the balance of the adhered thermoplastic layers, the adhered thermoplastic layers constituting a recording magnetic stripe.

* * * * *